United States Patent [19]

Sugama

[11] Patent Number: 4,889,718
[45] Date of Patent: Dec. 26, 1989

[54] POLYACID MACROMOLECULE PRIMERS

[75] Inventor: Toshifumi Sugama, Mastic Beach, N.Y.

[73] Assignee: Associated Universities, Inc., Washington, D.C.

[21] Appl. No.: 188,974

[22] Filed: May 2, 1988

[51] Int. Cl.$^4$ ............................ C09J 7/02; B32B 15/08
[52] U.S. Cl. .................................. 428/343; 428/423.1; 428/425.8; 428/457; 428/463
[58] Field of Search ...................... 428/343, 423.1, 457, 428/463, 425.8

[56] References Cited

U.S. PATENT DOCUMENTS

| | | | |
|---|---|---|---|
| 4,567,107 | 1/1986 | Rizk et al. | 428/425.5 |
| 4,610,898 | 9/1986 | Engel et al. | 427/379 |
| 4,612,236 | 9/1986 | Hsu et al. | 428/463 X |
| 4,657,962 | 4/1987 | Brindopke et al. | 428/423.1 |
| 4,668,588 | 5/1987 | Kishima | 428/423.1 |
| 4,714,512 | 12/1987 | House et al. | 428/423.1 X |
| 4,741,934 | 5/1988 | Terayama et al. | 428/457 X |

OTHER PUBLICATIONS

Sugama et al.; "Nature of Interfacial Interaction Mechanisms Between Polyacrylic Acid Macromolecules and Oxide Metal Surfaces", J. Mater Sci. 19, 4045, Dec. 1983 pp. 1'29.

Sugama et al. (2), "Effects of Polyacrylic Acid Primers on Adhesion and Durability of FPL-Etched Aluminum/Polyurethane Systems", J. of Adhesion Science and Technology, vol. I, No. 4, Jan/1987, pp. 265-280.

Sugama et al. (3) "Polyitaconic Acid Macromolecule, Primer for Adhesive Bonding and Corrosion Control of Aluminum", TriService Corrosion Conference, May 1987, pp. 1–14.

Primary Examiner—Thomas J. Herbert
Attorney, Agent, or Firm—Margaret C. Bogosian

[57] ABSTRACT

Hydrophylic polyacids, such as macromolecules of polyitaconic acid and polyacrylic acid, where such macromolecules have molecular weights >50,000 as primers between a polymeric top coating, such as polyurethane, and an oxidized aluminum or aluminum alloy. A near monolayer of primer is used in polymeric adhesive/oxidized aluminum adhered joint systems in 0.05% primer concentration to give superior results in standard peel tests.

12 Claims, 2 Drawing Sheets

POLYACID MACROMOLECULE PRIMERS

This invention was made with Government support under contract number DE-AC02-76CH00016 between the U.S. Department of Energy and Associated Universities, Inc. The Government has certain rights in the invention.

BRIEF DESCRIPTION OF THE INVENTION

The present invention describes the formulation and use of hydrophilic-type polyacid macromolecules, usually with molecular weights greater than 50,000, to significantly enhance the surface characteristics of oxidized aluminum and aluminum alloys. When these polyacid macromolecules, which contain functional carboxylic acid pendent groups are used as a coupling or crosslinking primer in polymeric adhesive/oxidized aluminum adherend joint systems, they preferentially interact both with the hydrated oxide aluminum adherend to form hydrogen bonds and with the functional groups in the adhesive to yield polymer-to-polymer chemical bonding. This chemical coupling between the hydrated adherend and the polymeric adhesive acts significantly to promote interfacial adhesive bonds. It appears that a near monolayer of polyacid is enough to occupy all available functional groups at the adhesive and aluminum surface sites. This arrangement plays a key role in governing the adhesion durability of the joint system and the corrosion resistance of aluminum upon exposure to a corrosive fluid. The bond stability and corrosion protective ability are due primarily to the formation of interfacially produced hydrophobic reaction products.

BACKGROUND OF THE INVENTION

The important factors that determine the ability of polymer coatings to protect structural aluminum surfaces from corrosion are the magnitude of the wettability of the Al surface by liquid polymer materials and the stability of the interaction products formed at polymer-to-Al interfaces. In order to achieve enhanced wettability, the Al surface should have a high surface free energy for enhanced surface reactivity and sufficient roughness to provide a large surface area for promoting wetting and mechanical locking. If the chemical interaction at the polymer/Al joint results in the formation of valence bonds, mainly covalent, the interfacially-formed interaction products will not only result in an increase in the basic adhesion, but also contribute to a modification of the chemical composition at the interfacial regions. This modification should be associated with the formation of hydrophobic interaction products which can be expressed as passivating layers.

To date, two commercial surface preparations for Al, the Forest Products Laboratory (FPL) preparation [Eichner et al., Forest Products Laboratory Report No. 1813, Madison, Wis., 1950] and the Phosphoric Acid Anodization (PAA) process [Kabayaski et al., Boeing Corporation Report No. D6-41517, Seattle, Wash., 1974], have been widely applied to promote interfacial bond strength at aluminum adhesive joints. The purpose of these surface treatments is not only to increase the roughness of the Al surface thereby enhancing the mechanical interlocking bonds, but also to modify the surface chemical compositions.

One significant problem that has been encountered with these commercial surface preparations is that when the freshly etched aluminum surface is exposed to moisture, hydration begins to occur. Considerable attention has been given to the growth and transformation of the FPL oxide to a hydrated oxide Al in the interfacial regions as this interface was exposed at various times to a humid environment. The chemical transformation commences when the moisture penetrates through the polymer layer and reaches the original adherend oxide adjacent to the adhesives. The reaction of Al oxide with moisture results in the formation of the hydrated oxide Al which represents a different morphology from the original oxide. This interfacial conversion of Al oxide to hydroxide leads to the generation of adhesion stress and swelling and the promotion of crack propagation at or near the Al-hydroxide interfaces, thereby resulting in bond failure and the initiation of corrosion. In either the FPL or PAA treatment, an oxide adherend that will resist attack by moisture is the critical element for bond durability.

Prior art approaches to dealing with the moisture problem involve the tailoring of the reactive surface nature using organosilane and titanate derived coupling agents as chemical modifications for Al oxide and hydroxide surfaces. However, oligomers or unreacted mono silanols are still present in the coupling layers. The presence of unreacted functional silanol leads to the hydrolysis of the coupling layer brought about by penetration of moisture through the adhesive, as the adhesive/coupling/adherend joint system is exposed to high humidity environments. This relates directly to the hydrolytic delamination failure mode.

The simplicity of polyacid molecules such as the polyacrylic acid (PAA) and polyitaconic acid (PIA) macromolecules, which consist of $-CH_2-CH-$ main chains and functional carboxylic acid pendent groups, makes them very attractive for use in resolving the problems presented by the prior art materials. Work related to the nature of interfacial reactions which play key roles in determining the extent of bonding between PAA/PIA and crystalline hydrate conversion coatings deposited as corrosion protective films on steel surfaces is known [Sugama et al., J. Mater. Sci., 19, 4045, 1984]. Even though the rough surface morphology of the conversion coatings enhances the interfacial mechanical bonding, the regularly oriented pendent carboxylic acid groups at the interface are readily accessible to proton donor-acceptor interactions to form hydrogen bonds with the polar hydroxyl groups which occupy the outermost surface sites of hydrated crystal layers. This interaction behavior of PAA/PIA has been found to play an essential role in promoting good interfacial bond performance.

DETAILED DESCRIPTION OF THE INVENTION

Figure 1:
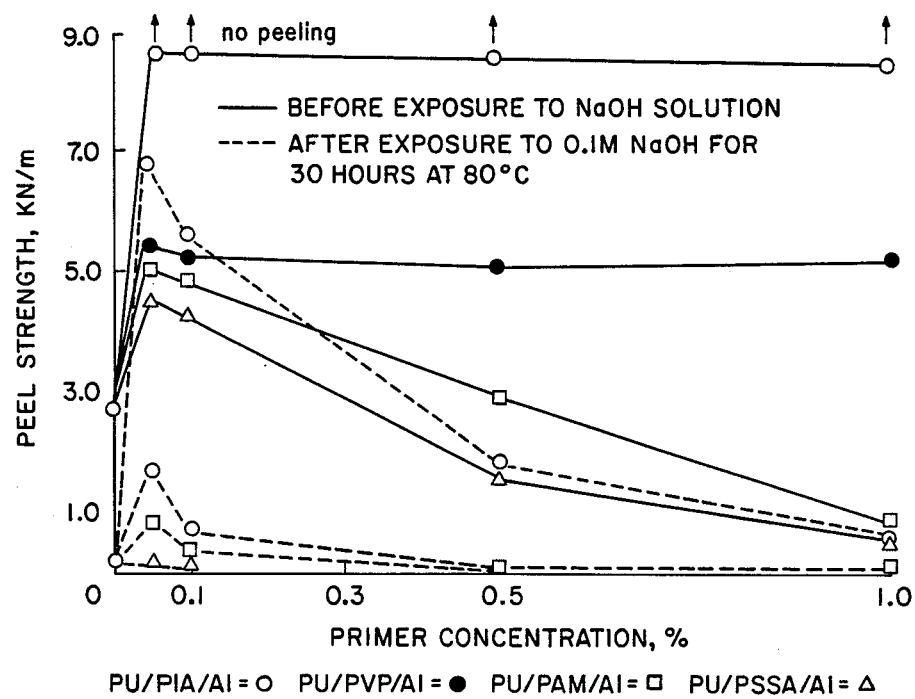
FIG. 1 shows the peel strength as a function of primer concentration for: (1) polyurethane (PU)/PIA/Al (o); (2) PU/polyvinylpyrrolidone (PVP)/Al ; (3) PU/polyacrylamide (PAM)/Al (□); and (4) PU/polystyrenesulfonic acid (PSSA)/Al (Δ) joint systems before and after exposure for 30 hours to hot alkali at 80° C.

The present invention relates to a polymer topcoat, polyacid primer, and oxidized aluminum or aluminum alloy in a sandwich construction. The polyacid is selected from macromolecules >50,000 M.W., with polyitaconic acid (PIA) and polyacrylic acid (PAA) being preferred. The polyacid is applied in near monolayer depth. This primer technique overcomes the poor bond strength that results from the prior art approaches. Comparative peel strength of one preferred embodiment of the present invention PU/PIA/Al compared with conventional polymeric coats is shown in FIG. 1. As seen in FIG. 1, the peel strength of the unexposed PU/Al control specimens prepared without the use of primers, was increased by more than three times when a PIA intermediate primer layer was applied. In contrast, the use of polyvinylpyrrolidone (PVP), polystyrenesulfonic acid (PSSA), and polyacrylamide (PAM) primers was less effective.

The present invention describes the role and nature of PAA and PIA for use as a primer in adhesive-treated aluminum joint systems. In one embodiment of the present invention, the joint systems can be composed of a Forest Product Laboratory (FPL) process-etched aluminum adherend, polyacid primers, with PAA and PIA primers being preferred, and polyurethane adhesive. The FPL aluminum etching process involves immersing aluminum in a hot chromic acid solution so that the surface is readily oxidized to form a layer of amorphous $Al_2O_3$ and Gamma-$Al_2O_3$ during the etching process. One of the most significant features of a fresh $Al_2O_3$ surface is its extremely high susceptibility to moisture. The reversible physisorption of water is known as a first stage in the hydration process of $Al_2O_3$. When a freshly etched surface is immersed in cold water, an amorphous hydroxide is formed at the outermost surface sites, whereas a surface treated with hot water reveals the formation of crystalline boehmite and bayerite outer layers. Therefore, the compositions of aging FPL etched surfaces probably consist of aluminum hydroxide or hydrated aluminum oxide layers covering an aluminum oxide layer.

The objective of the present invention is to use the polyacid primer to promote adhesive bonding of the FPL adherend-PU adhesive joints and to improve the adhesion durability under hot alkaline environments, the type of environments found in geothermal applications among others.

The thin polyacid primer films of a near monolayer (<50Å) thickness, which are applied on the oxidized aluminum alloys, are prepared as follows: (1) the acid-treated aluminum substrate is immersed in a <0.1% PIA or PAA solution in water for 5 min. at room temperature, and (2) the substrate is then oven heated at a temperature ranging from 100° to 150° C. for approximately 30 min. to solidify the polyacid macromolecules.

In order to achieve good adhesion of polymer adhesive to hydrated aluminum oxide or aluminum hydroxide adherend, water-soluble PAA and PIA macromolecules are applicable as a primer for the adherend-adhesive joints. When the polyacid primer is contacted with FPL-etched aluminum surfaces, macromolecules having regularly oriented functional COOH pendent groups are mobile enough to continuously wet the aluminum oxide hydrate surface sites at which the interfacial chemical affinity is particularly favorable. Subsequently, the proton-donating COOH groups form strong hydrogen bonds with the polar hydroxyl groups as proton acceptors which form on the outermost surface sites of oxidized aluminum. The preferred hydrogen bond formation in the interfacial regions is responsible for the development of interfacial bonding in PAA/PIA adherend joints. The presence of discontinuous salt formation at the interface, which results from the presence of nucleophilic $Na^+$, $Ca^{2+}$, and $Cu^{2+}$ ions on the etched surface, results in locally generated disbondment, thereby reducing the bond strength. Thus such salt formation should be avoided.

In addition, the use of a PAA or PIA primer improves the peel strength of the PU polymer/adherend joints because of the interfacial chemical reaction occurring between the carboxylic acid groups of PAA and PIA, and the isocyanate groups in the PU topcoat. Good bond performance and durability brought about by the use of PAA or PIA is associated not only with the chemical crosslinking functions connecting the hydrated oxide aluminum with the PU adhesive but also with the optimum thickness of the intermediate primer layers. The latter means that the PAA/PIA film should have only enough functional groups to occupy all available hydroxyl and isocyanate groups at the adherend and adhesive interface sites. In fact, the presence of a near monolayer of PAA or PIA film, produced using a 0.05% concentration in an aqueous medium, plays a key role in achieving excellent bond durability in hot alkaline solutions. The crosslinking structure of the polyacid primer in the interfacial regions contributes significantly to the formation of a stable interfacial bond which is resistant to moisture because of transformation of hydrophilic COOH to hydrophobic reaction products at the interfaces. The near monolayer application of the polyacid primer is critical. The presence of the additional COOH groups associated with thicker PAA and PIA layers contributes to gel-induced primer failures beneath the PU topcoat.

EXAMPLE 1

Materials and Methods Employed In Experimental Work

The aluminum substrate used in the experiments was a clad aluminum sheet (denoted 2024-T3) containing the following chemical constituents: 92 wt % Al, 0.5 wt % Si, 0.5 wt % Fe, 4.5 wt % Cu, 0.5 wt % Mn, 1.5 wt % Mg, 0.1 wt % Cr, 0.25 wt % Zn, and 0.15 wt % other. Commercially available PAA, 0.05 to 5.0% solution in water, having an average molecular weight (M.W.) of 104,000, was employed as a primer coating to promote adhesive bonding. Polyurethane (PU) resin was applied as an elastomeric topcoating. Polymerization of the PU was initiated by incorporating a 50% aromatic amine curing agent.

The oxide etching of the aluminum was prepared in accordance with a well-known commercial sequence called the Forest Products Laboratory (FPL) process. As the first step in the preparation, the surfaces were wiped with acetone-soaked tissues to remove any organic contamination. They were then immersed in chromic-sulfuric acid ($Na_2Cr_2O_7 \cdot 2H_2O$: $H_2SO_4$: Water=4:23:73 by weight) for 10 min at 80° C. After etching, the fresh oxide surfaces were washed with deionized water at 30° C. for 5 min, and subsequently dried for about 15 min at 50° C. After drying, the surfaces were aged in the air at about 80% relative humidity for 7 days. All the etched substrates were stored in a desiccator to avoid adsorption of additional water.

Thin PAA primer films were applied to the treated aluminum surfaces by immersing them in the PAA solutions for about 5 min at room temperature. After immersion, the substrates were left in an oven at 150° C. for about 1 hr. to solidify the PAA macromolecules.

Commercial-grade polyurethane (M313 resin, Lord Corporation) was applied as an elastomeric topcoating. The polymerization of silica-filled PU composite was initiated by incorporating a 50% aromatic amine curing agent M201. The initiated topcoat system was then cured in the oven at a temperature of 80° C.

EXAMPLE 2

Preparation and Testing of Materials

PU polymer was overlaid onto PAA- or PIA-coated aluminum substrates, and then the PU-coated specimens were subjected to a 0.1M NaOH solution at 80° C. for 5 hr. All of the edges on the PU-coated plate specimens used in the tests to estimate the bond durability of the PU/PAA or PIA-10 min-etched aluminum adhesive joints were unprotected. The adhesion durability at the interface was evaluated on the basis of 180° peel strength tests performed at room temperature. For a comparison with the adherend properties of PAA- or PIA-overlaid substrate surfaces, two other substrate surfaces, non-etched plain aluminum and etched aluminum without a PAA or PIA coating, were also examined. The peel strength of the PU/PAA or PIA/etched aluminum joints before and after exposure to the NaOH solution were determined as a function of PAA and PIA film thickness and concentration applied on the etched surfaces. These results are shown in Table 1. For the unexposed specimens, a considerable increase in peel strength was noted as the amount of PAA and PIA deposited was increased from 0.05% to 0.5%. The strength of 0.05% PAA- and PIA-containing films was about 70% of the maximum strength. After exposure 0.05% has been found to be the optimum concentration for development of peel strength as is shown in Table 1.

In contrast, the intrinsic adhesion mechanism observed at PU-to-etched substrate joints is more likely mechanical interlocking which relates directly to the surface roughness. This was thought to occur when PU resin set in the crater-like pits on the etched surface which gave a mechanical key. However, the physical interlocking formation appears to yield a much stronger bond than that produced with an unetched smooth substrate surface.

TABLE 1

Variations in 180° -Peel Strength at PU-PAA or PIA-Al Joints, Before and After Exposure to Hot NaOH Solution as a Function of Primer's Thickness and Concentration

| Primers | Concentration % | Film Thickness nm | Peel Strength, kg/cm | |
|---|---|---|---|---|
| | | | Before Exposure | After Exposure |
| non-etched Al | 0 | 0 | 0.95 | * |
| etched Al | 0 | 0 | 2.24 | * |
| PIA | 0.05 | 1.0 | 5.35 | 4.10 |
| PIA | 0.10 | 3.5 | 8.21 | 6.25 |
| PIA | 0.50 | 20.0 | 8.00 | 2.10 |
| PIA | 1.00 | 110.0 | 7.90 | 0.39 |
| PAA | 0.05 | 1.5 | 6.10 | 2.88 |
| PAA | 0.10 | 5.0 | 7.14 | 2.57 |
| PAA | 0.50 | 27.0 | 8.20 | 0.63 |
| PAA | 1.00 | 150.0 | 8.26 | 0.42 |

*Separation failure of PU film

EXAMPLE 3

Peel Strength

Figure 2:
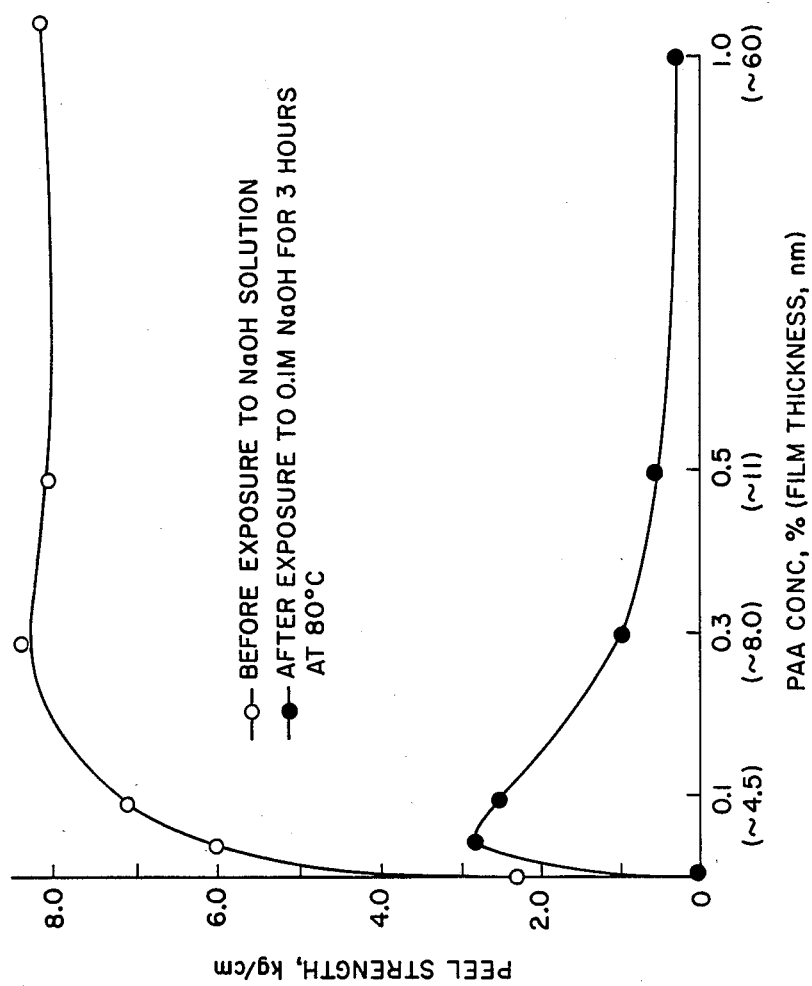
FIG. 2 shows the variation in 180°-peel strength of PU-PAA-aluminum joints, before and after exposure to hot NaOH solution, as a function of PAA concentration.

Peel strength measurements were performed on specimens after exposure to hot alkaline solutions. As seen in FIG. 2, although all specimens exhibit strength reduction, the rate of reduction depends upon the PAA concentration and, therefore, the thickness of the primer. The lowest reduction in strength was obtained for specimens containing a 0.05% PAA primer layer which can be described as the formation of a near monolayer. The strength of the 0.1% PAA film which has a thickness of about 4.5 nm drops to about 35% of its original value. At higher concentrations, the rate of reduction increases significantly, ranging from 88% for about 8-nm-thick film to for about 60-nm-thick film.

Films of near monolayer thickness were less susceptible to the hot alkali because of the existence of few hydrolytically sensitive free COOH groups in the primer layers. In this case, most of the functional COOH groups in a monolayer of PAA at the interface between the aluminum substrate and the PU topcoating can react chemically with the available polar groups such as hydroxyl and isocyanate which are present on both the adherend and adhesive surface sites. Thus, for the best alkaline resistance, the PAA primers should have only enough functional groups to occupy all available surface polar sites. A small proportion of functional groups in the primer is optimum. Since the nature of the reaction product formed in the interfacial regions is important in achieving good bond durability, it should be noted that the chemical interactions at the PU-PAA-aluminum interfacial boundaries form new reaction compounds with hydrophobic characteristics less susceptible to the alkaline fluids. This hydrophobic structure formed at the interface plays an important role in achieving long-term bond durability in the chemically aggressive environments.

I claim:

1. A formed polymeric adhesive/polyacid/oxidized aluminum adherend joint system wherein the polyacid is water-soluble has a molecular weight >50,000 and is applied in near monolayer.

2. The joint system according to claim 1 wherein the polyacid is polyacrylic acid.

3. The joint system according to claim 1 wherein the polyacid is polyitaconic acid.

4. The joint system according to claim 1 wherein the polymeric adhesive is polyurethane.

5. A coupling and crosslinking primer comprising a water-soluble polyacid macromolecule of a molecular weight >50,000 near monolayer in depth used in a formed polymeric adhesive/oxidized aluminum adherend joint system.

6. A primer according to claim 5 wherein the polyacid is polyacrylic acid.

7. A primer according to claim 5 wherein the polyacid is polyitaconic acid.

8. A primer according to claim 5 wherein the polymeric adhesive is polyurethane.

9. An aluminum/polymer sandwich consisting of an oxidized aluminum base next to a water-soluble polyacid primer of near monolayer thickness and a top polymer layer.

10. A sandwich according to claim 9 wherein the polyacid primer is polyacrylic acid.

11. A sandwich according to claim 9 wherein the polyacid primer is polyitaconic acid.

12. A sandwich according to claim 9 wherein the polymer is polyurethane.

* * * * *